United States Patent
Hsu et al.

(10) Patent No.: US 6,628,507 B2
(45) Date of Patent: Sep. 30, 2003

(54) DATA PROCESSING DEVICE WITH LIQUID DISCHARGE CAPABILITY

(75) Inventors: Shih-Chung Hsu, Hsichih (TW); Hua-Chung Tseng, Hsichih (TW); Chia-Liang Yen, Hsichih (TW); Chu-Hsian Chian, Hsichih (TW)

(73) Assignees: Wistron Corporation, Hsichih (TW); Acer Inc., Hsichih (TW)

( * ) Notice: Subject to any disclaimer, the term of this patent is extended or adjusted under 35 U.S.C. 154(b) by 0 days.

(21) Appl. No.: 10/142,044

(22) Filed: May 8, 2002

(65) Prior Publication Data
US 2003/0048601 A1 Mar. 13, 2003

(30) Foreign Application Priority Data
Sep. 10, 2001 (TW) ........................................ 90215525 U

(51) Int. Cl.$^7$ .................................................. G06F 1/16
(52) U.S. Cl. .......................... 361/680; 361/679; 361/683
(58) Field of Search ................................ 361/679, 680, 361/683, 686

(56) References Cited
U.S. PATENT DOCUMENTS 5,490,036 A * 2/1996 Lin et al. .................... 361/680
5,754,395 A * 5/1998 Hsu et al. .................... 361/680

OTHER PUBLICATIONS

Crosby (US 2002/0145847 A1), "Portable Computer", Oct. 10, 2002.*

Merz et al. (US 2002/0154474 A1), "Computer Component Protection", Oct. 24, 2002.*

* cited by examiner

Primary Examiner—Darren Schuberg
Assistant Examiner—Yean-Hsi Chang
(74) Attorney, Agent, or Firm—Merchant & Gould, P.C.

(57) ABSTRACT

A data processing device includes a main body, a display unit, a keyboard unit, and a liquid discharge path. The main body includes a casing and a circuit board. The casing includes an upper case having a top side formed with a tray receiving recess that is confined by an upright peripheral wall. The display and keyboard units are coupled electrically to the main body. The keyboard unit includes a tray and a plurality of keys. The tray includes a bottom wall and a surrounding wall. The liquid discharge path is formed through the surrounding wall and the peripheral wall, and/or through the bottom wall of the tray and the upper and lower cases of the casing, and is adapted to permit discharge of liquid that spills into the tray.

15 Claims, 5 Drawing Sheets

DATA PROCESSING DEVICE WITH LIQUID DISCHARGE CAPABILITY

CROSS-REFERENCE TO RELATED APPLICATION

This application claims priority of Taiwan Patent Application No. 090215525, filed on Sep. 10, 2001.

BACKGROUND OF THE INVENTION

1. Field of the Invention

The invention relates to a data processing device, more particularly to one having a liquid discharge capability.

2. Description of the Related Art

Referring to FIG. 1, a conventional data processing device 81, such as a portable computer, is shown to comprise a main body 82, a display unit 83, and a keyboard unit 84. The display unit 83 and the keyboard unit 84 are coupled electrically to the main body 82. The main body 82 includes a casing 823 and a circuit board 825 disposed in the casing 823. The casing 823 includes an upper case 821 and a lower case 822. The upper case 821 has a top side 8211 formed with a downwardly extending rectangular tray receiving recess 8212. The circuit board 825 is disposed on a bottom wall 8221 of the lower case 822. The keyboard unit 84 includes a tray 87 which is mounted in the tray receiving recess 8212, and a plurality of keys 85 arranged in the tray 87. The tray 87 has a size and shape that complement those of the tray receiving recess 8212.

When liquid 86, such as water, is accidentally spilled on the keys 85, the liquid 86 accumulates in the tray, and may affect functioning of the circuit board 825 since the capacity of the tray 87 is very limited, and since the tray 87 is not capable of discharging the liquid 86 that accumulated therein.

SUMMARY OF THE INVENTION

Therefore, the main object of the present invention is to provide a data processing device with a liquid discharge capability to overcome the aforesaid drawback of the prior art.

According to one aspect of the invention, a data processing device comprises a main body, a display unit, a keyboard unit, and a liquid discharge path. The main body includes a casing and a circuit board disposed in the casing. The casing includes an upper case and a lower case connected to the upper case. The upper case has a top side formed with a downwardly extending tray receiving recess that is confined by an upright peripheral wall. The display unit is coupled electrically to the main body. The keyboard unit is coupled electrically to the main body, and includes a tray and a plurality of keys arranged in the tray. The tray includes a bottom wall and a surrounding wall that extends uprightly from a periphery of the bottom wall. The tray is mounted in the tray receiving recess. The liquid discharge path is formed through the surrounding wall and the peripheral wall, and is adapted to permit discharge of liquid that spills into the tray.

According to another aspect of the invention, a data processing device comprises a main body, a display unit, a keyboard unit, and a liquid discharge path. The main body includes a casing and a circuit board disposed in the casing. The casing includes an upper case and a lower case connected to the upper case. The upper case has a top side formed with a downwardly extending tray receiving recess. The display unit is coupled electrically to the main body. The keyboard unit is coupled electrically to the main body, and includes a tray and a plurality of keys arranged in the tray. The tray includes a bottom wall and a surrounding wall that extends uprightly from a periphery of the bottom wall. The tray is mounted in the tray receiving recess. The liquid discharge path is formed through the bottom wall of the tray and further through the upper case and the lower case of the casing, and is adapted to permit discharge of liquid that spills into the tray.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
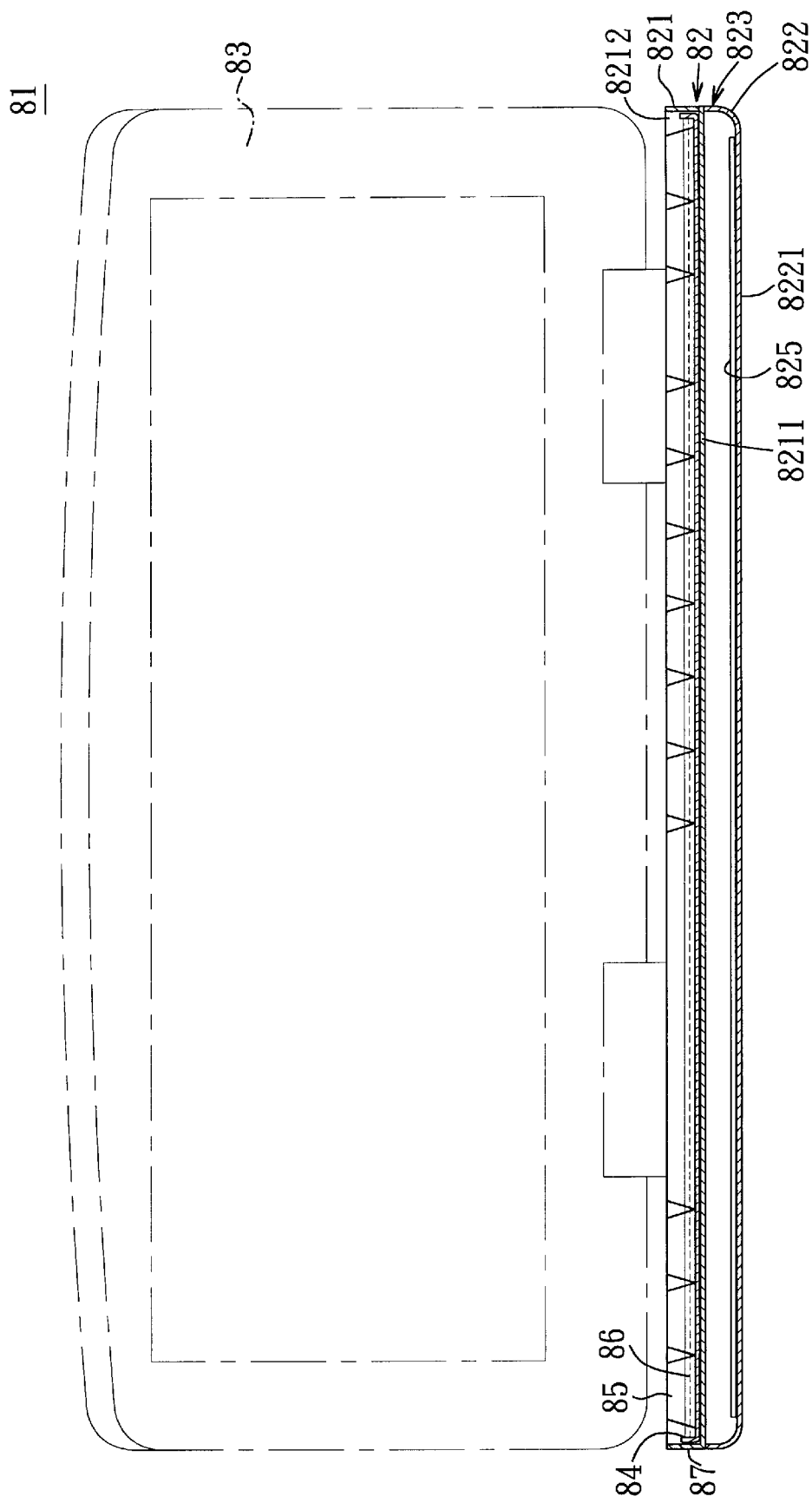
FIG. 1 is a schematic sectional view of a conventional data processing device.
Figure 2:
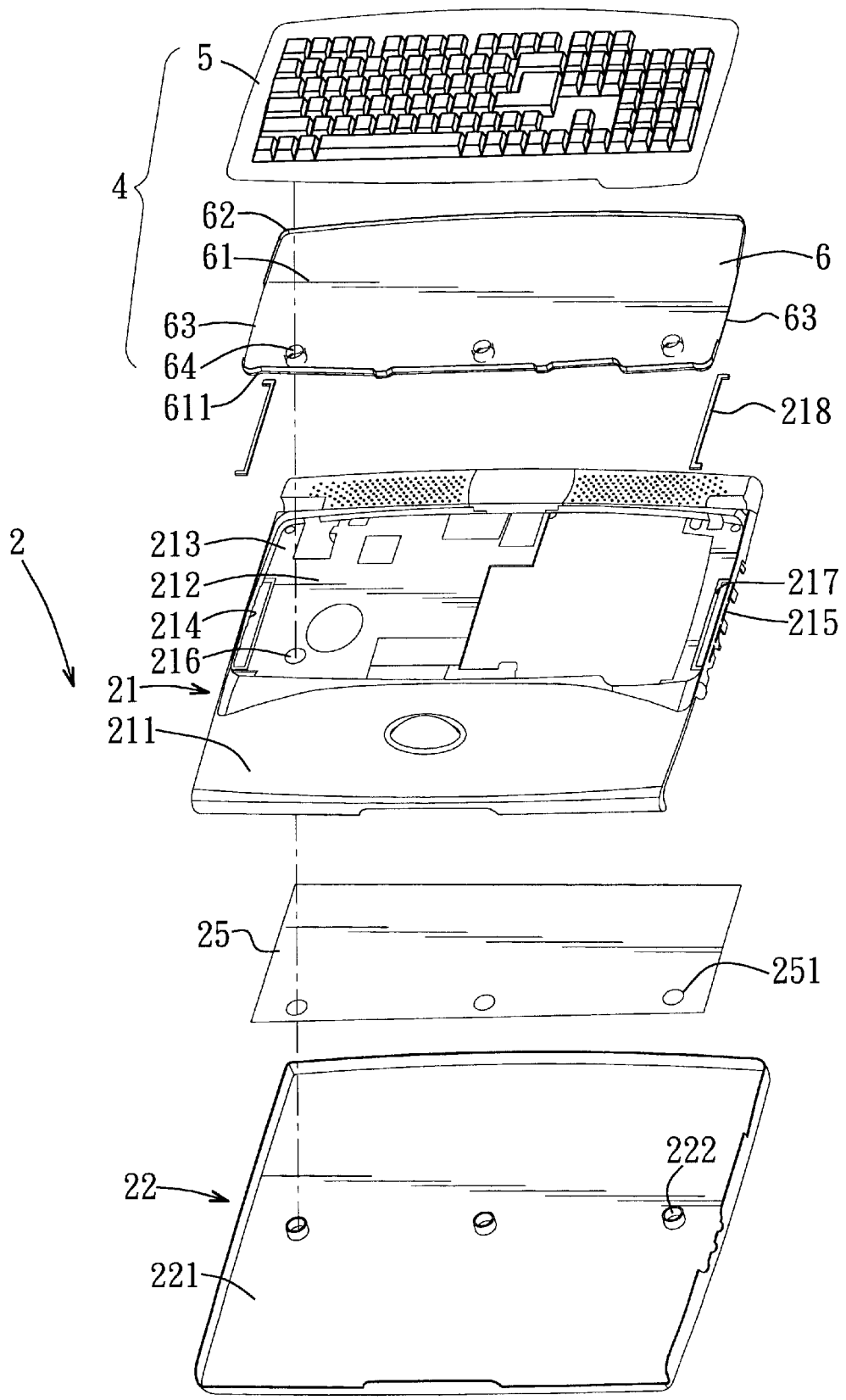
FIG. 2 is an exploded perspective view of the preferred embodiment of a data processing device according to the present invention, wherein a display unit is not shown for the sake of brevity.
Figure 3:
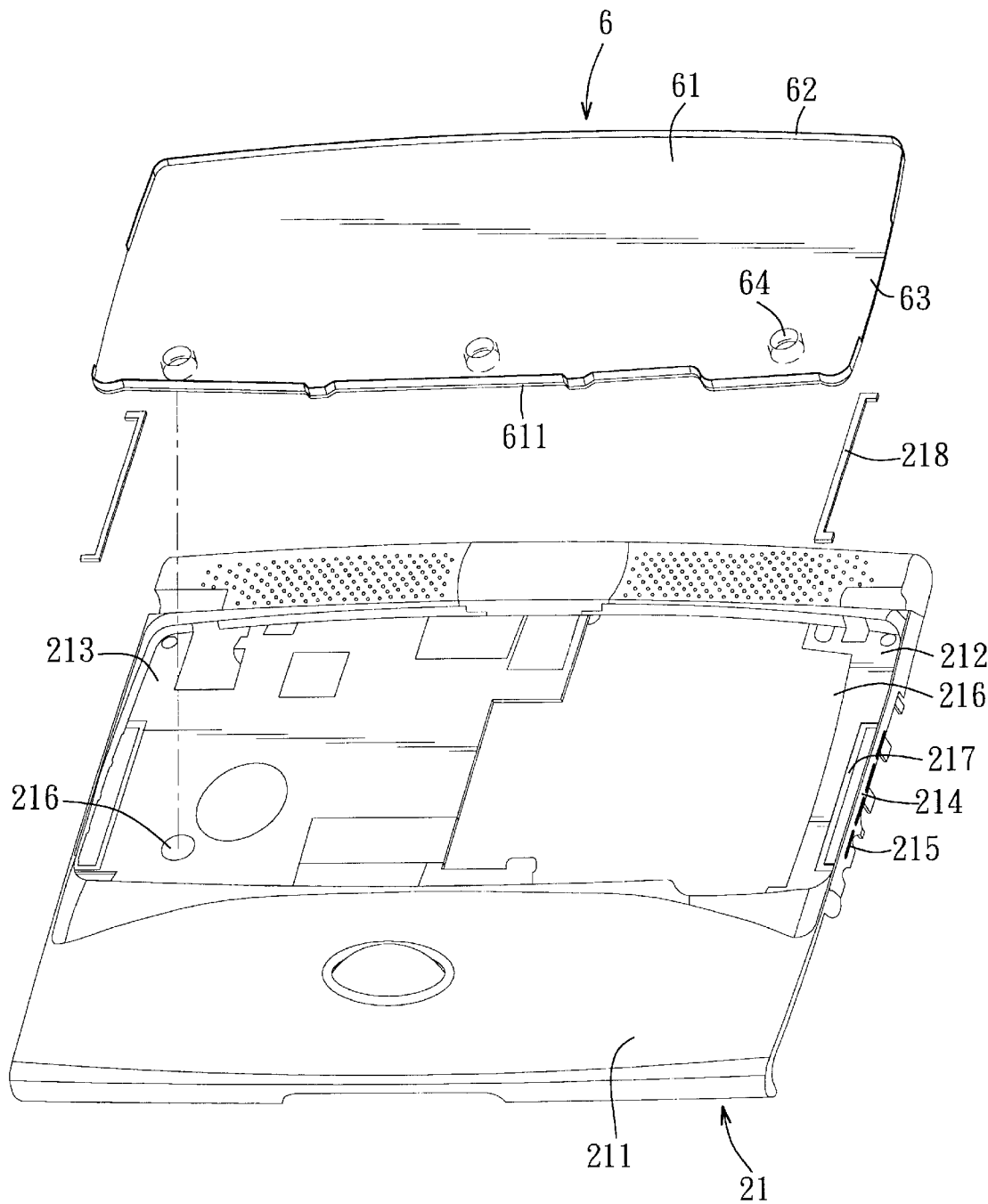
FIG. 3 is an exploded perspective view showing a tray, a liquid blocking member, and an upper case of the preferred embodiment.

Referring to FIGS. 2 to 6, the preferred embodiment of a data processing device 1 according to the present invention is shown to be embodied in a portable computer that comprises a main body 2, a display unit 3, a keyboard unit 4, two first liquid discharge paths (A), and three second liquid discharge paths (B).

The main body 2 includes a casing 23 and a circuit board 25. The casing 23 includes an upper case 21 and a lower case 22 connected to the upper case 21. The upper case 21 has a top side 211 formed with a downwardly extending rectangular tray receiving recess 212 that is confined by an upright peripheral wall 214, and further has a top support frame 213 that is connected to the peripheral wall 214 and that defines a bottom end of the tray receiving recess 212. The peripheral wall 214 has two opposite lateral sides, each of which is formed with a plurality of second lateral liquid passages 215. Each of the second lateral liquid passages 215 is in the form of a slot. The top support frame 213 has middle liquid passages 216, each of which is in the form of a hole, and two channel grooves 217, each of which is disposed adjacent to a set of the second lateral liquid passages 215.

The lower case 22 of the casing 2 has a bottom support wall 221 formed with three aligned and spaced apart lower liquid passages 222, each of which is in the form of a lower tube that extends uprightly from the bottom support wall 221 to the top support frame 213 of the upper case 21.

The circuit board 25 is disposed on the bottom wall 221 of the lower case 22, and is formed with three aligned and spaced apart through holes 251 that permit extension of the lower liquid passages 222 in the bottom support wall 221 therethrough.

The display unit 3, such as an LCD display, is coupled electrically to the main body 2, and is pivotable between covering and uncovering positions relative to the main body 2 in a conventional manner.

The keyboard unit 4 is coupled electrically to and is mounted on the main body 2, and includes a tray 6 and a plurality of keys 5 arranged in the tray 6. In this embodiment, the tray 6 is a rectangular shallow tray having a size and shape that complement those of the tray receiving recess 212. The tray 6 includes a bottom wall 61 and a surrounding wall 62 that extends uprightly from a periphery of the bottom wall 61. The bottom wall 61 has a bottom surface adhered with a waterproof layer 611 that prevents leakage of liquid through openings in the bottom wall 61. The waterproof layer 611 can be made of Mylar or other suitable materials. The bottom wall 61 further has three aligned and spaced apart upper liquid passages 64 that are in fluid communication with the middle and lower liquid passages 216, 222. Each of the upper liquid passages 64 is in the form of an upper tube that extends downwardly from the top support frame 213 through one of the middle liquid passages 216 in the upper case 21 (see FIG. 3), through a corresponding hole 251 in the circuit board 25, and into the lower tube of a corresponding lower liquid passage 222 in the lower case 22.

Figure 4:
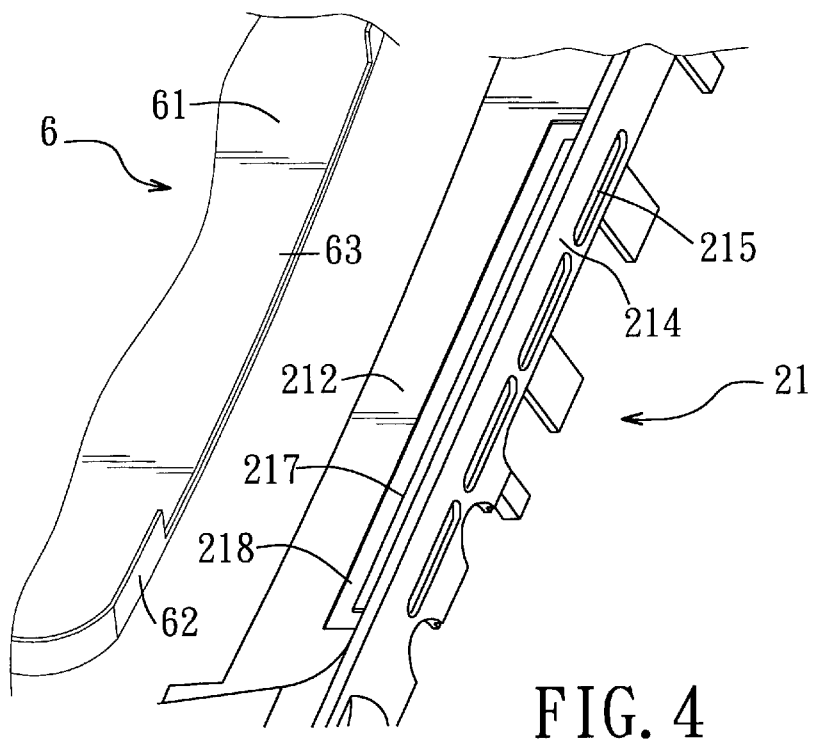
FIG. 4 is an enlarged fragmentary perspective view of FIG. 3, illustrating the spatial relationship among the tray, the blocking member, and the upper case when the tray is mounted on the upper case.

The surrounding wall 62 of the tray 6 has two opposite lateral sides, each of which is formed with a first lateral liquid passage 63. The first lateral liquid passage 63 corresponds to and is in fluid communication with a set of the second lateral liquid passages 215, each of which is smaller than the first lateral liquid passage 63, as best illustrated in FIG. 4. The first lateral liquid passage 63 is in the form of a notch that extends downwardly from a top edge of the surrounding wall 62 of the tray 6.

Figure 5:
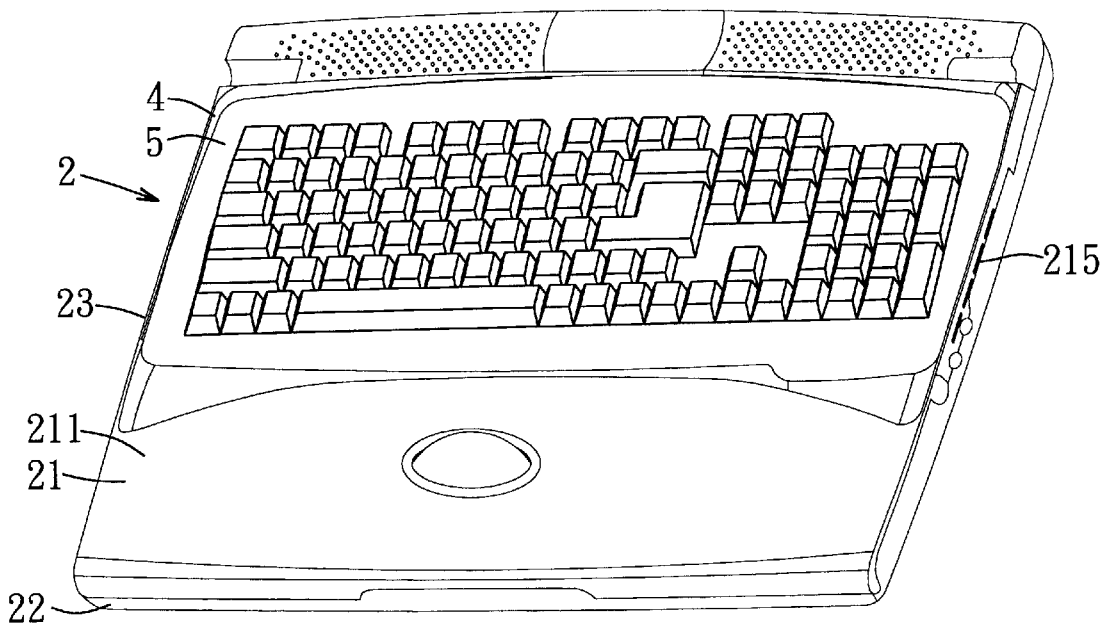
FIG. 5 is an assembled perspective view showing the preferred embodiment without the display unit.

FIG. 5 illustrates the preferred embodiment in an assembled state, but without the display unit 3.

Figure 6:
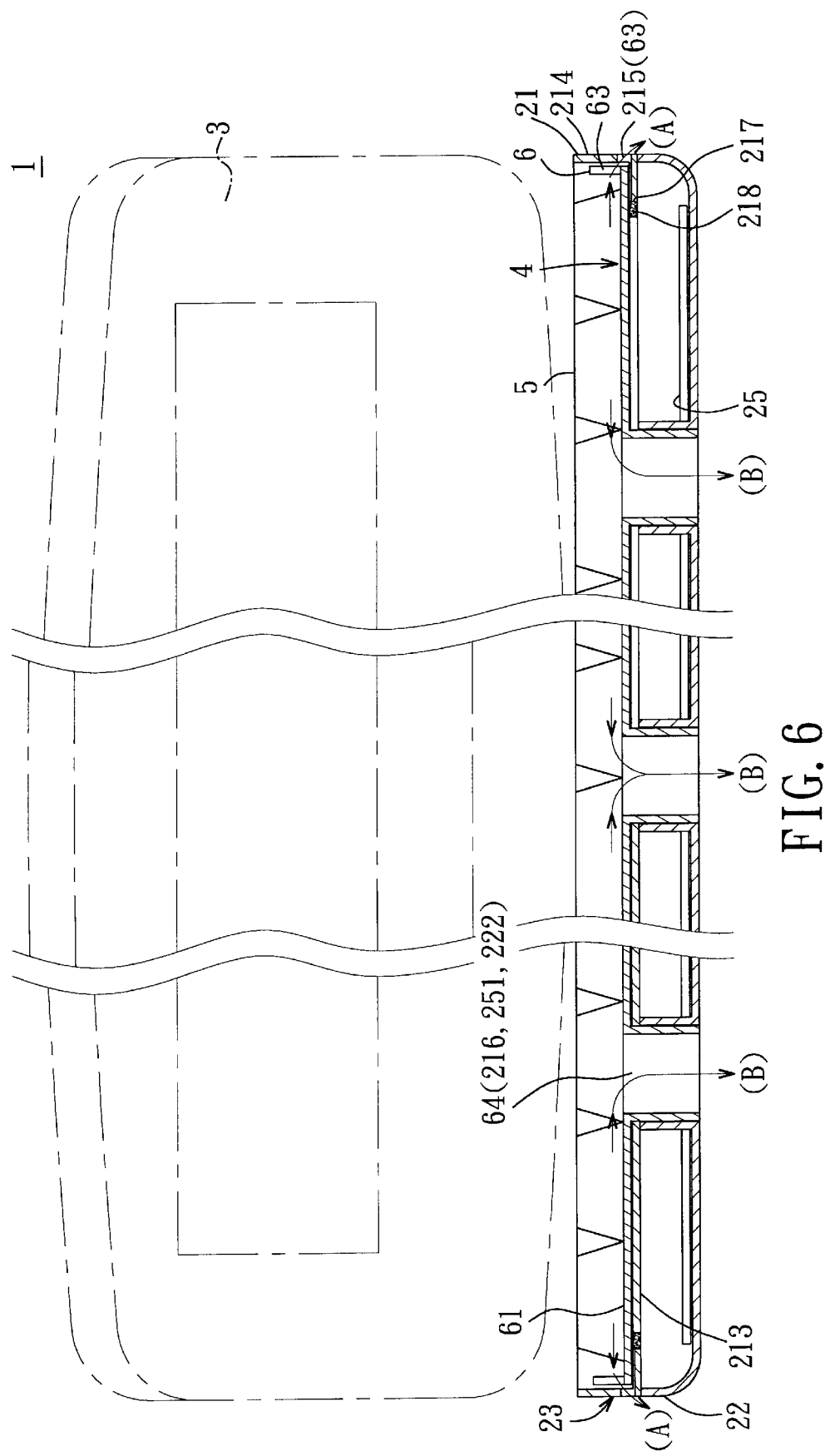
FIG. 6 is a schematic sectional view of the preferred embodiment, illustrating the various liquid discharge paths thereof.

Each first liquid discharge path (A) includes one of the first lateral liquid passages 63 in the surrounding wall 62 of the tray 6 and one set of the second lateral liquid passages 215 in the peripheral wall 214 of the upper case 21, as best illustrated in FIG. 6. A liquid blocking member 218 is mounted in a channel groove 217 in the top support frame 213 that surrounds each first liquid discharge path (A) so as to prevent liquid from seeping into a clearance formed between the bottom wall 61 of the tray 6 and the top support frame 213 of the upper case 21. The liquid blocking member 218 is made of a flexible material which can absorb liquid or which is waterproof, such as foam or rubber. Each channel groove 217 has a first length in a first direction. Each first liquid discharge path (A) has a second length in the first direction in the surrounding wall 62 of the tray 6. The first length is longer than the second length.

Each second liquid discharge path (B) includes one of the upper liquid passages 64 in the bottom wall 61 of the tray 6, one of the middle liquid passages 216 in the upper case 21, and one of the lower liquid passages 222 in the lower case 22, as best illustrated in FIG. 6.

The first and second liquid discharge paths (A), (B) are adapted to permit instantaneous discharge of the liquid that spills into the tray 6.

Because the data processing device 1 of this invention is provided with liquid discharge paths (A), (B) which can discharge liquid quickly in lateral and downward directions, the liquid is prevented from accumulating in the tray 6. Furthermore, due to the channel grooves 217 and the liquid blocking members 218, the liquid is further prevented from flowing into the main body 2, thereby protecting the circuit board 25.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

We claim:

1. A data processing device comprising:
    a main body including a casing and a circuit board disposed in said casing, said casing including an upper case and a lower case connected to said upper case, said upper case having a top side formed with a downwardly extending tray receiving recess that is confined by an upright peripheral wall;
    a display unit coupled electrically to said main body;
    a keyboard unit coupled electrically to said main body, said keyboard unit including a tray and a plurality of keys arranged in said tray, said tray including a bottom wall and a surrounding wall that extends uprightly from a periphery of said bottom wall, said tray being mounted in said tray receiving recess; and
    a liquid discharge path formed through said surrounding wall and said peripheral wall and adapted to permit discharge of liquid that spills into said tray.

2. The data processing device as claimed in claim 1, wherein said liquid discharge path includes at least one first lateral liquid passage formed in said surrounding wall of said tray, and at least one second lateral liquid passage formed in said peripheral wall of said upper case and in fluid communication with said at least one first lateral liquid passage.

3. The data processing device as claimed in claim 2, wherein said surrounding wall of said tray has two opposite sides, each of which is formed with one of said first lateral liquid passages.

4. The data processing device as claimed in claim 2, wherein said first lateral liquid passage corresponds to a plurality of said second lateral liquid passages, each of which is smaller than said first lateral liquid passage.

5. The data processing device as claimed in claim 2, wherein said first lateral liquid passage is in the form of a notch that extends downwardly from a top edge of said surrounding wall of said tray, and said second lateral liquid passage is in the form of a slot formed in said peripheral wall of said upper case.

6. The data processing device as claimed in claim 1, wherein said upper case further has a top support frame connected to said peripheral wall and defining a bottom end of said tray receiving recess, said data processing device further comprising a liquid blocking member mounted on said top support frame adjacent to said liquid discharge path to prevent liquid from seeping into a clearance formed between said bottom wall of said tray and said top support frame of said upper case.

7. The data processing device as claimed in claim 6, wherein said liquid blocking member is made of foam.

8. The data processing device as claimed in claim 6, wherein said liquid blocking member is made of rubber.

9. The data processing device as claimed in claim 6, wherein said top support frame has a top side formed with a channel groove, said liquid blocking member being disposed in said channel groove.

10. The data processing device as claimed in claim 9, wherein said channel groove has a first length in a first direction, said liquid discharge path having a second length in the first direction in said surrounding wall of said tray, the first length being longer than the second length.

11. The data processing device as claimed in claim 1, wherein said data processing device is a portable computer.

12. A data processing device comprising:
    a main body including a casing and a circuit board disposed in said casing, said casing including an upper case and a lower case connected to said upper case, said upper case having a top side formed with a downwardly extending tray receiving recess;
    a display unit coupled electrically to said main body;
    a keyboard unit coupled electrically to said main body, said keyboard unit including a tray and a plurality of keys arranged in said tray, said tray including a bottom wall and a surrounding wall that extends uprightly from a periphery of said bottom wall, said tray being mounted in said tray receiving recess; and
    a liquid discharge path formed through said bottom wall of said tray and further through said upper case and said lower case of said casing and adapted to permit discharge of liquid that spills into said tray.

13. The data processing device as claimed in claim 12, wherein said lower case has a bottom support wall, and said liquid discharge path includes at least one upper liquid passage formed in said bottom wall of said tray, and at least one lower liquid passage formed in said bottom support wall of said lower case and in fluid communication with said at least one upper liquid passage.

14. The data processing device as claimed in claim 13, wherein:
    said upper case has a top support frame that defines a bottom end of said tray receiving recess, said liquid discharge path further including at least one middle liquid passage formed in said upper case and in fluid communication with said upper and lower liquid passages;
    said lower liquid passage is in the form of a lower tube that extends uprightly from said bottom support wall of said lower case toward said top support frame of said upper case; and
    said upper liquid passage is in the form of an upper tube that extends downwardly from said bottom wall of said tray and into said lower tube of a corresponding said lower liquid passage in said lower case.

15. A data processing device comprising:
    a main body including a casing and a circuit board disposed in said casing, said casing including an upper case and a lower case connected to said upper case, said upper case having a top side formed with a downwardly extending tray receiving recess that is confined by an upright peripheral wall;
    a display unit coupled electrically to said main body;
    a keyboard unit coupled electrically to said main body, said keyboard unit including a tray and a plurality of keys arranged in said tray, said tray including a bottom wall and a surrounding wall that extends uprightly from a periphery of said bottom wall, said tray being mounted in said tray receiving recess;
    a first liquid discharge path formed through said surrounding wall and said peripheral wall; and
    a second liquid discharge path formed through said bottom wall of said tray and further through said upper case and said lower case of said casing;
    said first and second liquid discharge paths being adapted to permit discharge of liquid that spills into said tray.

* * * * *